United States Patent [19]
Aton et al.

[11] Patent Number: 5,361,137
[45] Date of Patent: Nov. 1, 1994

[54] PROCESS CONTROL FOR SUBMICRON LINEWIDTH MEASUREMENT

[75] Inventors: Thomas J. Aton, Dallas; Phillip Chapados, Jr., Plano; Jimmy W. Hosch; Ajit P. Paranjpe, both of Dallas, all of Tex.

[73] Assignee: Texas Instruments Incorporated, Dallas, Tex.

[21] Appl. No.: 938,078

[22] Filed: Aug. 31, 1992

[51] Int. Cl.⁵ .................................. G01B 9/02
[52] U.S. Cl. ..................... 356/354; 356/355; 356/384
[58] Field of Search ............... 356/350, 354, 351, 355, 356/384

[56] References Cited

U.S. PATENT DOCUMENTS

| | | | |
|---|---|---|---|
| 4,050,821 | 9/1977 | Cuthbert et al. | 356/156 |
| 4,330,213 | 5/1982 | Kleinknecht et al. | 356/355 |
| 4,408,884 | 10/1983 | Kleinknecht et al. | 356/355 |

FOREIGN PATENT DOCUMENTS

| | | |
|---|---|---|
| 2853427 | 6/1979 | Germany . |
| 3305977 | 8/1984 | Germany . |

OTHER PUBLICATIONS

"Continuous Optical Measurement of the Dry Etching of Silicon Using the Diffraction of a Lamellar Grating", Geraldo F. Mendes, Lucila Cescato, Jaime Frejlich, Edmundo S. Braga, and Alaide P. Mammmana, *J. Electrochem Soc.: Solid-State Science and Technology*, Jan. 1985, pp. 190-193.

"In Situ Wafter Monitoring for Plasma Etching", Dennis S. Grimard, Fred L. Jerry Jr., and Michael E. Elta, University of Michigan, Department of Electrical Engineering and Computer Science, 1301 Beal Avenue, Ann Arbor, Mich. 48109-2122.

"Optical Monitoring of the Etching of SiO₂ and Si₈N₄ on Si by the Use of Grating Test Patterns", H. P. Kleinknecht and H. Meier, *J. Electrochem Soc.: Solid-State Science and Technology*, May 1978, pp. 798-803.

"A Simple Technique for Linewidth Measurement of Gratings on Photomasks", S. Sohail H. Naqvi, Susan Gaspar, Kirt Hickman, and John R. McNeil, Center for High Technology Materials, University of New Mexico, Albuquerque, N. Mex. 87131.

"In Situ Monitoring of Sub-micron Linewidths using a Diffraction Grating Test Pattern", Phillip Chapados, Ajit Paranjpe, Jimmy Hosch, and Cecil Davis, Texas Instruments Inc.

*Primary Examiner*—Samuel A. Turner
*Assistant Examiner*—LaCharles Keesee
*Attorney, Agent, or Firm*—John C. Crane; Richard L. Donaldson

[57] ABSTRACT

A method and apparatus for measuring submicron linewidths, using diffraction gratings. A set of "fixed-linewidth variable-pitchwidth" test gratings has a number of gratings, each grating having the same linewidth but having different pitchwidths. These gratings are illuminated to form diffraction patterns. A set of peak intensities of the first or second order diffraction image from each grating is recorded. Either of these intensity values forms a curve around an extrema, which represents the intensity from a grating whose pitchwidth is equal to one-half the linewidth.

8 Claims, 2 Drawing Sheets

PROCESS CONTROL FOR SUBMICRON LINEWIDTH MEASUREMENT

TECHNICAL FIELD OF THE INVENTION

This invention relates to manufacturing process control, and more particularly to a method for measuring the linewidth of applied or removed strips of material.

BACKGROUND OF THE INVENTION

Integrated circuit fabrication is only one example of a manufacturing process that requires close tolerances of the width of features produced on the wafer. For example, it is important that the width of etch lines during resist processing be controlled within certain critical dimension limits.

Today's wafer fabrication processes include real-time process control steps as a part of the manufacturing process. This permits appropriate adjustments to be made. Ideally, linewidth monitoring is on a wafer by wafer basis, and performed in-situ.

A number of existing techniques may be used to perform linewidth measurements. Techniques based on ordinary microscopes are satisfactory for use when the line widths are about 1.5 micrometers or larger. For submicron measurements, older methods use scanning electron microscopy. A problem with this method is that it is not real time or in-line, and thus is not conducive to wafer by wafer process control.

A recently developed linewidth measurement method uses test patterns in the form of diffraction gratings, which are placed in a test area of the wafer. Depending on whether the substrate being tested is transparent, the incident light is reflected or transmitted to generate diffraction beams. The gratings are monitored during fabrication by illuminating the grating with a monochromatic light, such as from a laser beam, and analyzing the resulting diffraction pattern to determine its linewidth. If the lines of the grating are made in the same manner as lines on the rest of the wafer, measurement of the grating linewidth can be used to infer the linewidths of the other lines on the wafer.

A linewidth measurement system using a diffraction grating is described in U.S. Pat. No. 4,330,213 to Kleinknecht, et al. The system obtains the intensity of first and second order light and uses the following equation to determine, the linewidth, lw:

$$lw = d/\pi \cos^{-1}(I2/I1)^{\frac{1}{2}}$$

where d is grating period (linewidth plus spacewidth), and I1 and I2 are measured intensities of the first and second diffraction orders.

The advantage of using intensity ratios is that many factors that affect intensity drop out of the equation. However, in practice, approximations such as the one in the preceding paragraph are insufficient for accurate measurements. Because the intensity ratio also depends on the ratio of line-to-space reflectivity, they are not accurate unless the lines and spaces being measured have very high contrast.

In addition to the problems of accounting for factors such as reflectivity, a problem with many existing diffraction methods is that they require the measurement of more than one order of diffraction. The availability of these intensity measurements is related to the width of the pitch for the lines being measured and the wavelength of the illuminating light. If conventional light sources such as visible or near ultraviolet are to be used, the existing methods require large pitch values.

A need exists for a method of measuring linewidths having small pitch values. The method should provide for in-situ monitoring as a part of a manufacturing process control.

SUMMARY OF THE INVENTION

One aspect of the invention is a method of determining an unknown linewidth on a surface having lines and spaces of different transmissivity or reflectivity, or other diffraction producing characteristic. A set of at least two test gratings are made of the surface. Each of these gratings has the same unknown linewidth, but a different known pitchwidth. The gratings are illuminated with incident light to produce first order diffraction patterns. The first order intensity value of the diffraction pattern from each of the gratings is detected. Each intensity value is associated with a pitchwidth from the corresponding grating, and these relationships form a curve, whose extrema value represents a grating whose pitchwidth is twice the unknown linewidth. Interpolation can be used to find this extrema-value pitchwidth, which can then be divided by two to determine the unknown linewidth.

Another method of using the same test grating involves detected second order intensity values. Like the first order values, these second order values may be fit to a curve. The extrema value of this curve corresponds to a grating whose pitchwidth is twice the unknown linewidth.

The method is especially useful during fabrication of any item of manufacture having lines or spaces that must have a certain small linewidth. The set of test gratings can be placed in a test area of the item, and the gratings' lines made in the same manner as the lines on the item of manufacture. Then, by measuring the lines of the test gratings, the width of the lines on the production item can be inferred.

A technical advantage of the invention is that it provides for in-situ monitoring of submicron linewidths. The method can be performed in "real time" in the sense that during those line-making processes that involve gradual increases or decreases of width until a desired width is obtained, measurements can be taken during the line-making process and the process stopped once the desired line width is obtained. Furthermore, the measurements can be used not only to control a particular step, but for feed-forward control of subsequent steps and feed-back control of prior steps.

DETAILED DESCRIPTION OF THE INVENTION

Fixed-linewidth Variable-Pitch Grating Set

Figure 1:
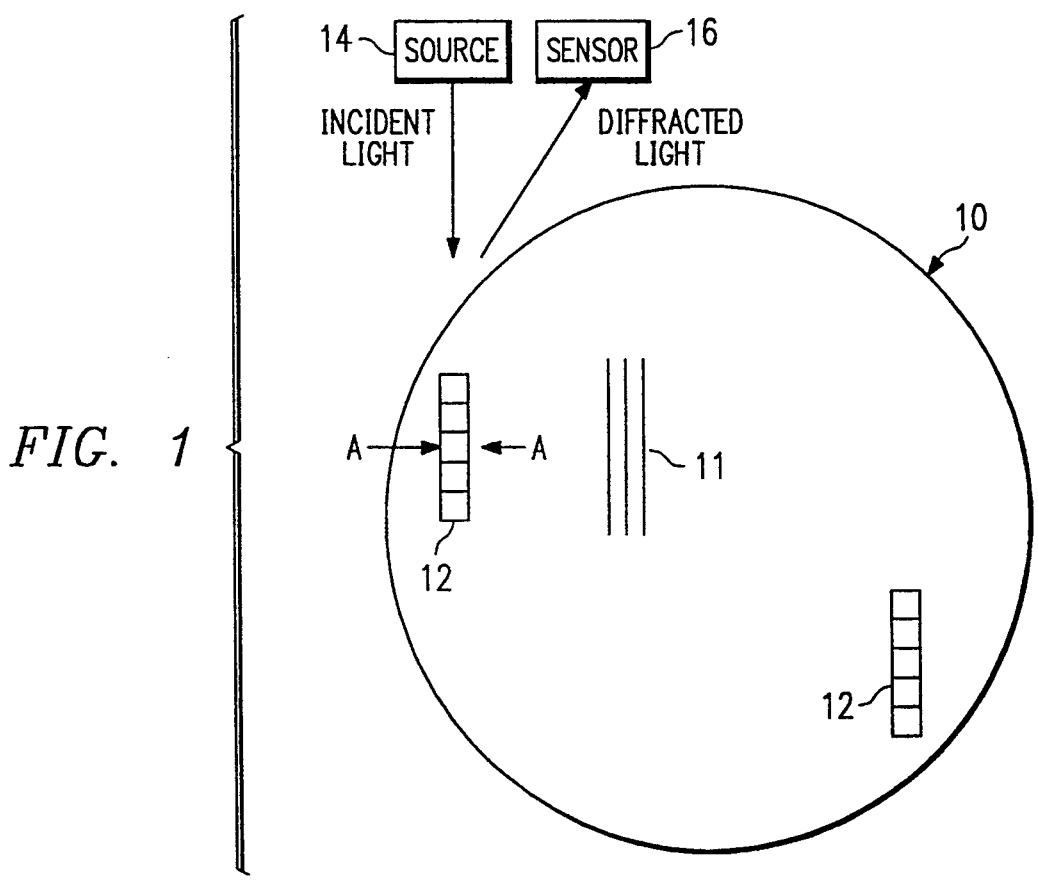
FIG. 1 illustrates the surface of a production item, on which lines are fabricated, having two grating patterns in accordance with the invention.

FIG. 1 illustrates the surface of a production item 10, such as a semiconductor wafer, on which lines 11 are produced. Item 10 has two grating sets 12 in accordance with the invention. Item 10 might also have only one grating set 12 or more than two grating sets 12. As explained below in connection with FIGS. 2 and 3, each grating set 12 is a set of fixed-linewidth variable-pitch diffraction gratings, whose lines have a width similar to the width of lines 11.

In a typical application, grating set 12 is made during any production stage that involves making lines 11 on the surface of item 10. In FIG. 1, lines 11 are greatly enlarged relative to item 10, and would typically be of the order of a micron or less.

Examples of production stages in which grating set 12 might be made are during semiconductor fabrication, when lines are to be made to precise widths during resist formation, etching, or metallization. In a related application, grating set 12 could be made on a mask during mask production to measure the width of the mask lines. In any event, in a most general sense, grating 12 could be placed on any item 10 on which lines having widths in the order of a micron or less are being made, either by depositing material or removing it.

As will be explained below, grating set 12 has lines that are made in the same manner as the lines 11 on the rest of the surface of item 10. Regardless of when or how the grating lines are made, the assumption is that the width of the lines on grating set 12 are sufficiently similar to the width of lines 11 such that measurement of the grating lines can be used to infer the width of lines 11. Typically, the grating lines are used to measure the most narrow lines 11 on item 10. Usually, grating set 12 will be made on a surface that is the same as the rest of the surface of item 10, however, it is conceivable that this might not be the case. For example, grating set 12 might be placed on a transmissive "window" in a wafer, whose remaining surface is reflective. However, any such differences affect the intensity of diffracted light, and these differences must be accounted for.

The location of grating sets 12 on item 10 is not important to the invention; they may be placed at any convenient place. Where item 10 is a semiconductor wafer, they might, for example, be placed in a corner of the actual production chips or be placed in process control areas between the actual production chips, or in some other area that is not used for production of the chips themselves. Also, grating sets 12 may be used at any layer of production where lines are produced, and more than one set of grating sets 12 may be used at different stages on different layers. In the language of integrated circuit manufacture, grating sets 12 could be referred to as a type of "test structure".

The size of grating set 12 may vary, depending on the size of item 10 and the width of the lines 11 to be measured. If item 10 is a wafer of a size in the order of those in use today, a typical grating set 12 might be 5 mm $\times$ 1 mm in size.

Depending on the nature of item 10 and the type of lines being made, grating set 12 can model different types of diffraction gratings. If its lines and spaces exhibit different transmissivities, such when grating set 12 is made on a mask glass to measure mask lines, it models a transmissive diffraction grating. If its lines and spaces exhibit different reflectivities, such as when grating set 12 is being used to measure etch lines on a semiconductor wafer substrate, it models a reflective diffraction grating. Finally, if the reflectivities and transmissivities are the same or nearly the same, but a phase shift is produced between reflection from the lines and spaces, then grating set 12 models a phase shift grating.

In the example of FIG. 1, grating set 12 models a reflective diffraction grating. Light from a source 14 is incident on the surface of item 10. Typically, for simplicity of measurement calculations, the incident light is monochromatic. It is shown as being normal to the surface of grating set 12, but this is not required. Grating set 12 reflects light to an optical sensor 16, which detects the intensities of at various angles along the range of the diffraction set. Sensor 16 may be any optical receiving means such are known in the art of linewidth measurement with diffraction gratings. A complete system for use in accordance with the method of the invention is described below in connection with FIG. 4.

Figure 2:
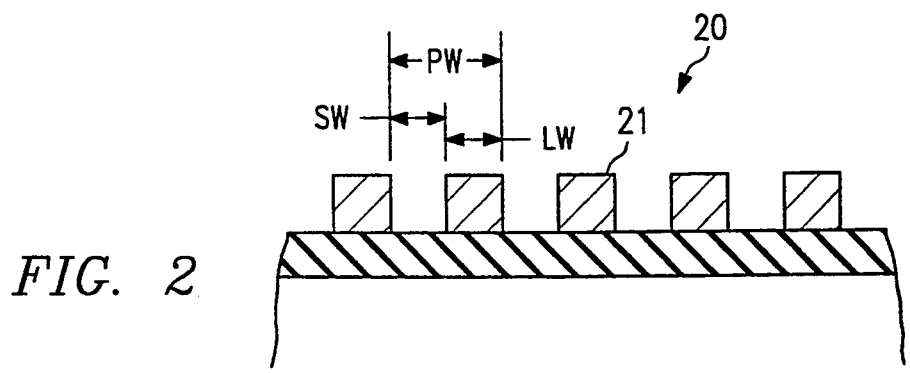
FIG. 2 is a cross sectional view of one grating of the grating set of FIG. 1.

FIG. 2 is a typical cross sectional view of one of the diffraction gratings 20 of a grating set 12, in this case, along line A—A of FIG. 1. Although grating 20 is shown with only five lines 21, a typical grating 20 would have many more lines 21. If a typical grating set 12 is 1 mm wide, it might for example, have approximately 500 lines.

As stated above, the lines 21 of grating 20 have a linewidth, lw, which is similar to that of the production lines 11 on the production item 10. Typically, grating lines 21 will be made in the same manner as lines 11, so that they are "the same" which provides a direct inference between a measured line 21 and a production line 11. Thus, $$lw_{grating} \cong lw_{production}.$$

The space between grating lines 21 has a uniform spacewidth, sw. The grating 20 has a pitchwidth, pw, equal to the sum of the width of a line and the width of an adjacent space. The linewidth, $lw_{grating}$, is the parameter to be measured. The pitchwidth, pw, is assumed to be known. Because the linewidth is not known, the spacewidth is not known.

The use of the terms "lines" and "linewidths" to refer to the raised portions of grating 20 is somewhat arbitrary. The description herein, which is in terms of measuring "lines", is equally applicable to measuring spaces or other features. Thus, "line" and "linewidth" are used at all times herein to refer to either a raised line or a set-in space In fact, in the most general sense, "line" is used to refer to any feature having alternating reflectivities, transmissivities, or phase shifts, or other diffraction grating property.

Figure 3:
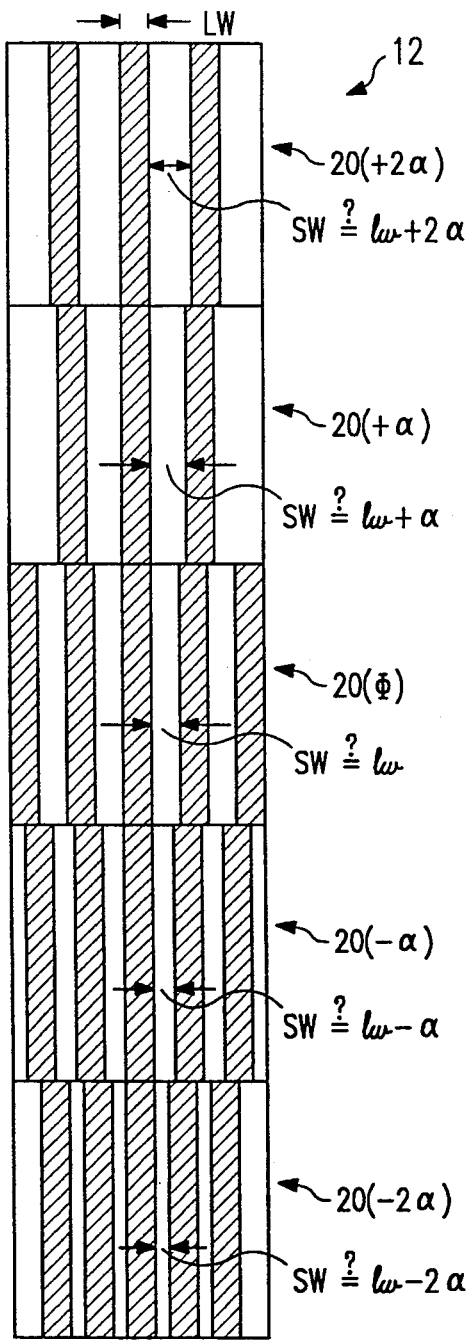
FIG. 3 is a plan view of the grating set of FIG. 1.

FIG. 3 is a plan view of a grating set 12, which has five gratings 20. Grating set 12 may be described as a set of variable-pitchwidth fixed-linewidth, diffraction gratings 20. Alternatively, if spaces rather than lines are being measured, grating set 12 could be comprised of variable-pitchwidth fixed-spacewidth diffraction gratings.

As explained below, each grating 20 is used to provide a first or second order intensity value, which is used to determine an intensity curve. Thus, a large number of gratings 20 in each grating set 12 and smaller pitch variations between gratings 20 in the set tends to enhance accuracy. However, as few as two gratings 20 could be used in a grating set 12. For example, only two gratings 20 might be used where the width of lines 11 is so fine that the process described herein is limited by available pitchwidths. With two gratings 20, the extrapolation to determine linewidth is more difficult as the shape of the curve must be known beforehand, either experimentally or theoretically. A preferred embodiment uses a set of at least three gratings 20, with at least one grating having the expected linewidth equal to the expected spacewidth. The number of gratings 20 is otherwise unimportant, so long as the fixed-linewidth variable-pitch pattern is followed within each set 12.

The lines 21 of each grating 20 have the same linewidth, $lw_{grating}$, as those of all other gratings 20. Because the linewidth is the value being measured, $lw_{grating}$ is unknown. However, grating lines 21 typically have an "expected" width, in that whatever manufacturing process is being used to make grating lines 21, there is some sort of linewidth control such that the grating lines 21 are at least near the expected linewidth.

The spacewidth, sw, between lines 21 varies among gratings 20. However, within each grating 20, the spacing between lines 21 is a uniform spacewidth, sw.

As a result of the different spacewidths, each grating 20 has a different pitchwidth, pw. Thus, the pitchwidth varies from grating to grating, but within each grating 20, the pitchwidth, like the spacewidth, is uniform.

It is assumed that the pitchwidth of each grating 20 is known, although the linewidth and spacewidths are not. In practice, when the invention is used for semiconductor fabrication measurements, pitchwidths may be known from mask values, which are capable of accurately producing a desired pitchwidth. Or, pitchwidths can be calculated by measuring the distance between maximum intensity peaks, using diffraction calculations that are well-known in the art to be accurate.

In the example of FIG. 3, one grating 20 has lines 21 whose expected linewidth is assumed to be one-half the known pitchwidth. In other words, the linewidth is equal to the spacewidth. For this grating 20, $lw = sw$.

It follows that for this grating 20, $pw = lw + sw$, and, $lw = pw/2$.

In other gratings 20 of a grating set 12, the spacewidth is some value of the expected linewidth, plus or minus some increment. For purposes of example in FIG. 3, the spacewidth varies around a value, $\pm n\alpha$, where $n = \pm 1, 2, 3, \ldots$ Because there are five sections, each section 20 has a spacewidth, $sw = LW \pm n\alpha$, $n = \pm 1$ or 2.

It should be understood that FIG. 3 is just one example of a fixed-linewidth variable-pitch grating set 12. The spacewidth increments need not be uniform; any values of sw that vary near an expected linewidth value may be used. Also, the spacewidth variations need not be centered around the expected linewidth; they could vary in all positive or all negative increments on one side of an expected linewidth. Finally, a feature of the invention is that the expected linewidth need not be particularly close to the actual linewidth—as explained below, all that is needed is sufficient data to form the desired diffraction intensity curve.

First Order Intensity Method

A basic concept of the invention is that first order intensity measurements of the diffraction image from each grating 20 can be used to determine the actual linewidth of lines 21. In operation, it is assumed that there is sufficient contrast between lines and spaces, either in terms of reflectivity or transmissivity, to obtain a diffraction pattern. The discussion herein is in terms of Fraunhoffer diffraction, but if the Fraunhoffer limit does not apply, more complete theories of diffraction can be used.

As an overview of a method of using a grating set 12, each grating 20 is illuminated with a monochromatic light source. The resulting diffraction pattern is viewed on an image screen. The peak first order intensity from each grating 20 is detected and recorded. Each intensity value is associated with the pitchwidth of its grating 20. These intensity values, when plotted against their corresponding pitchwidth values, form a curve around an extrema value, which represents the intensity of light diffracted from a grating having a linewidth equal to its spacewidth.

The theoretical portions of the following description are in terms of transmissive type gratings, where "slits" transmit light to a detection surface. The slits are analogous to the lines 21 on grating set 12. The same principles apply where grating set 12 is reflective, as for a transmissive, slit type, grating.

In a diffraction grating, the intensity, I, of the diffraction image at any order, m, may be expressed as the simple model:

$$I(m) = C(1 + \cos\theta)^2 N^2 \frac{\sin^2(m\pi l/p)}{(m\pi/p)^2}$$

$$(r_l^2 + r_s^2 - 2r_l r_s \cos(\phi_l - \phi_s)),$$

where C is a constant, $\Theta$ is the angle between the normal and the angular location of the diffraction order, N is the number of lines in the grating, l is the linewidth, p is the pitchwidth, $r_l$ and $r_s$ and $\Phi_l$ and $\Phi_s$ are the amplitude and phase of the reflection coefficients from the lines and spaces.

For first order intensity, $m = 1$, and the above equation has a maximum value at $l = p/2$. Thus, a grating whose pitchwidth corresponds to the maximum first order intensity has a linewidth equal to one-half that pitchwidth.

Figure 4:
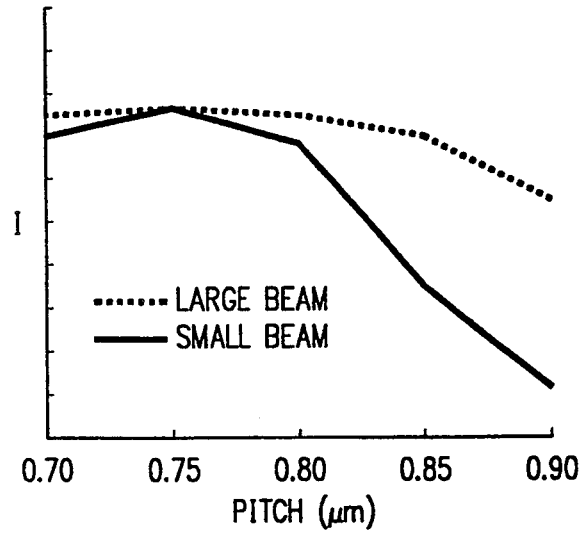
FIG. 4 illustrates an example of using the grating set to obtain first order intensity values to determine linewidth.

FIG. 4 illustrates an example of using a grating set 12 to measure linewidth. The fixed-linewidth variable-pitch grating set had five gratings 20. The expected linewidth was 0.375 micrometers. The pitchwidths varied by increments of 0.05 micrometers around a pitchwidth of 0.75 micrometers, which is twice the expected linewidth. The five gratings 20 used in the experiment had pitchwidths of 0.7, 0.75, 0.8, 0.85, and 0.9 micrometers. The incident light was monochromatic, normal to the gratings 20, and had a wavelength of 442.5 nanometers.

For each grating 20, the first order intensity was plotted against the corresponding pitchwidth. The units shown on FIG. 4 are arbitrary. A curve was fit through these intensity values as a function of pitchwidth. The curve's maximum corresponds to the pitchwidth where the linewidth is the same as the spacewidth, or pw=2×lw. In this example, the curve's maximum occurs at approximately pw=0.75 micrometers. Thus, the width of lines 21 is approximately 0.375 micrometers.

FIG. 4 also illustrates that the method is not sensitive to variations in beam size of the incident light. If the beam diameter is chosen such that it overfills the grating 20 whose intensity is being measured, and partially illuminates additional gratings 20, multiple first orders are simultaneously obtained.

In the example of FIG. 4, gratings 20 have pitchwidth values that were selected to vary around a pitchwidth that was twice an expected linewidth, and the resulting intensity curve nicely bracketed the first order maximum. Also, because the expected linewidth was the same as the true linewidth of lines 21, the maximum corresponds to the pitchwidth of one of the gratings 20. This might not always be the case; if the curve's maximum does not correspond to a grating 20, interpolation, fitting, or other mathematical methods can be used to find the pitchwidth corresponding to the maximum. This would be the pitchwidth of a grating, whose pitchwidth is twice the linewidth of lines 21.

Although the above discussion is in terms of a first order maximum, the same method could be applied where the intensity curve is inverted and its extrema is a minimum. Whether a first order minimum or maximum is being determined is a function of other factors, such as reflectivity. As an example, if the reflectivity ratio were the reverse of that of FIG. 4, the curve would be inverted.

Second Order Intensity Method

An alternative method of using grating set 12 involves the detection of second order maximum intensity values. As explained below, a grating whose linewidth is equal to one-half its pitchwidth has a second order intensity that is at an extrema, as compared to other gratings whose linewidths vary near half the pitchwidth.

For single slit diffraction, the intensity, I, of light reaching any location along a diffraction pattern on a detection plane is represented by the following equation:

$$I \alpha \sin^2 \beta / \beta^2,$$

where $\beta = (\pi D/\text{lambda}) \sin \Theta$. The angle $\Theta$ is the outgoing diffraction angle, D is the slitwidth, and lambda is the wavelength of the incident light. The above equation goes to zero where $$\sin \Theta = \text{lambda}/D.$$

In a diffraction grating, diffraction orders occur at "on axis" or "off-axis" locations, expressed in terms of $\Theta$:

$$\sin \Theta = m \text{ lambda}/pw,$$

where pw is the grating pitchwidth. The second order (m=2) occurs at:

$$\sin \Theta = 2 \text{ lambda}/2D$$

or, $$\sin \Theta = \text{lambda}/D,$$

which is the same as the single-slit value of $\Theta$ where intensity is zero.

The D value in the above equations corresponds to the linewidth of a grating 20 whose linewidth is half its pitch. For a grating in which the slitwidth is equal to the spacewidth, pw=2D. Thus, the pitchwidth of a grating whose second order intensity approaches the extrema of the intensities of other gratings is twice the linewidth of lines 21.

Figure 5:
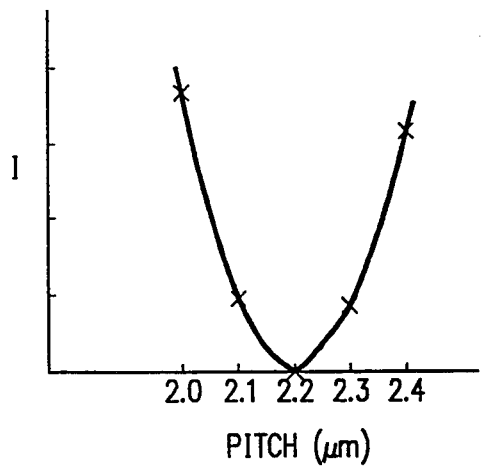
FIG. 5 illustrates an example of using the grating set to obtain second order intensity values to determine linewidth.

FIG. 5 illustrates an example of using a grating set 12 to measure linewidth. The fixed-linewidth variable-pitch grating set 12 had five gratings 20. The expected linewidth was 1.1 micrometers. The pitchwidths varied by increments of 0.1 micrometer around a pitchwidth of 2.2 micrometers, which is twice the expected linewidth. Thus, the five gratings 20 had pitch widths of 2.0, 2.1, 2.2, 2.3, and 2.4 micrometers. The curve is a theoretically expected curve, with arbitrary units of intensity, but in practice, this curve would be determined experimentally.

For each grating 20, the second order intensity peak is plotted against the corresponding pitchwidth. A curve can then be fit through these intensity values. The curve's minimum corresponds to the pitchwidth where the linewidth is the same as the spacewidth, or pw=2×lw. In this example, the curve's minimum occurs at approximately pw=2.2 micrometers, thus the width of lines 21 is approximately 1.1 micrometers.

In the example of FIG. 5, as in the example of FIG. 4, the gratings 20 had pitchwidth values that were selected to vary around a pitchwidth that is twice the expected linewidth. As a result, the curve nicely brackets the second order minimum. Also, because the expected linewidth was the same as the true linewidth of lines 21, the minimum corresponds to the pitchwidth of one of the gratings 20. However, if the curve's minimum does not correspond to a grating 20, various mathematical methods can be used to find the pitchwidth corresponding to the minimum second order intensity value. This would be the pitchwidth of a grating whose pitchwidth is twice the linewidth of lines 21.

Although the above discussion is in terms of a second order minimum, like the first order method, the second order method could be applied where the intensity curve is inverted. In this case, the curve's extrema would be a maximum. As an example, if the reflectivity ratio were the reverse of that of FIG. 5, the curve would be inverted.

In an alternative method of the invention, the maximum intensity values could be plotted against diffraction angle values from each grating 20. The diffraction angle associated with the curve's extrema can be easily mapped to the pitchwidth using the above diffraction equations.

In-situ Linewidth Measurement System

Figure 6:
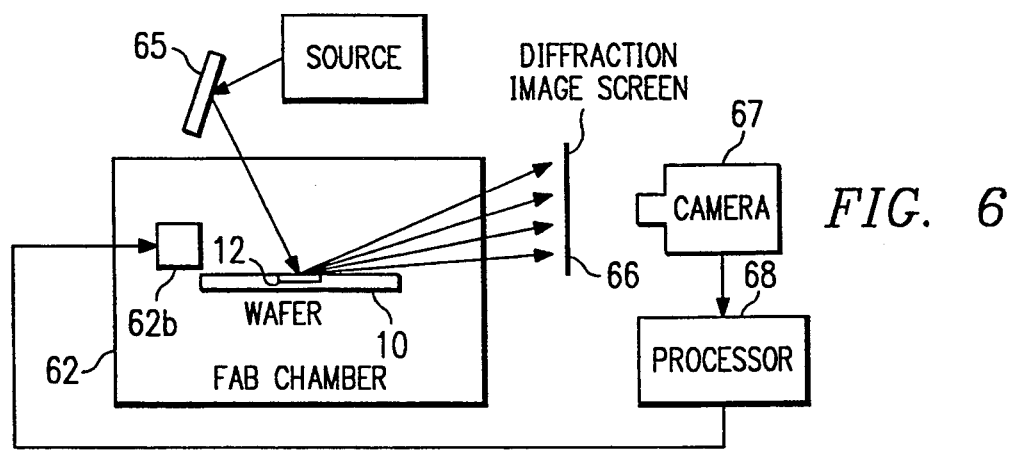
FIG. 6 illustrates a linewidth measurement system for in-situ use.

FIG. 6 illustrates a linewidth measurement system for use in accordance with the method aspects of the invention, during fabrication of a semiconductor wafer. A wafer 10, having at least one grating set 12, is in-situ in a fabrication chamber 62. A monochromatic source 64 provides light for illuminating grating set 12. An example of a suitable source 64 is a HeCd laser, which produces light with a 442.5 nanometer wavelength. In any event, source 64 provides light with a constant and known wavelength value, lambda, to be used in the calculations described above.

A beam steerer 65 receives light from source 64 and directs it to selected sections of grating set 12. In simple applications, such as when wafer 10 has one grating set 12 with its gratings 20 in a linear row, steerer 65 need only direct the beam along one direction, i.e., up and down grating set 12. However, in some applications, it may be desirable to have a two dimensional steerer 65, such as when there is more than one grating set 12 on wafer 10.

Diffracted light from gratings 20 is transmitted through a transparent wall of chamber 62 to a diffraction image screen 66. Each grating 20 produces a distinct image on screen 66. These images are captured by an image capture device 67, which may be a charge coupled device (CCD) camera.

The output of image capture device 67 is delivered to a processor 68, for processing in accordance with the method described above. Processor 68 is programmed with image processing algorithms that provide for acquisition and measurement of diffraction patterns. Processor 68 may be used to relate values of pitchwidth, or of $\Theta$ for a given lambda, to linewidth values. Processor 68 may be used to control an actuator 62b, or other device that controls linewidth during whatever fabrication process is being performed during the measurement.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of determining an unknown linewidth on a surface having lines and spaces of different transmissivity or reflectivity, or other diffraction producing characteristic, comprising the steps of:
   making a set of at least two test gratings on said surface, each of said gratings having the same unknown linewidth but a different known pitchwidth;
   illuminating each of said gratings with incident light;
   detecting the second order intensity values of the diffraction pattern from each of said gratings;
   calculating the minimum of a curve, which represents each of said intensity values plotted against the pitchwidth of the corresponding grating;
   determining the pitchwidth at said minimum; and
   dividing said pitchwidth by two to determine said unknown linewidth.

2. The method of claim 1, and further comprising the step of determining an expected value of said unknown linewidth, and wherein at least one of said gratings has a pitchwidth that is approximately twice said expected value.

3. The method of claim 2, wherein at least one other of said gratings has a pitchwidth approximately equal to twice said expected linewidth plus or minus a small incremental value.

4. The method of claim 1, and further comprising the step of determining an expected value of said unknown linewidth, and wherein said gratings have a pitchwidth that is approximately twice said expected value plus or minus a different incremental value.

5. The method of claim 1, wherein said step of making a series of test gratings comprises making lines on said gratings in the same manner as other lines on said surface, such that the linewidth of said other lines can be inferred from the linewidth of said gratings.

6. The method of claim 1, wherein said step of calculating the extrema comprises calculating a second order intensity maximum.

7. The method of claim 1, wherein said step of calculating the extrema comprises calculating a second order intensity maximum.

8. A method of comparing an unknown linewidth on a surface having lines and spaces of different transmissivity or reflectivity, or other diffraction producing characteristic, to a target linewidth, comprising the steps of:
   making a set of at least two test gratings on said surface, each of said gratings having the same unknown linewidth but a different known pitchwidth, wherein at least one of said gratings has a grating pitchwidth equal to twice an expected linewidth;
   illuminating each of said gratings with incident light;
   detecting the second order intensity values of the diffraction pattern from each of said gratings;
   calculating the minimum of a curve, which represents each of said intensity values plotted against the pitchwidth of the corresponding grating;
   determining the pitchwidth at said minimum; and
   comparing said pitchwidth to said grating pitchwidth.

* * * * *